US010552961B2

(12) United States Patent
Huang (10) Patent No.: US 10,552,961 B2
(45) Date of Patent: Feb. 4, 2020

(54) METHOD, DEVICE, AND NON-TRANSITORY COMPUTER READABLE STORAGE MEDIUM FOR OBJECT TRACKING

(71) Applicant: HTC Corporation, Taoyuan (TW)

(72) Inventor: Chao-Shuan Huang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 99 days.

(21) Appl. No.: 15/826,634

(22) Filed: Nov. 29, 2017

(65) Prior Publication Data

US 2018/0174304 A1  Jun. 21, 2018

Related U.S. Application Data

(60) Provisional application No. 62/435,856, filed on Dec. 19, 2016.

(51) Int. Cl.
| G06T 7/00 | (2017.01) |
| G06T 7/20 | (2017.01) |
| G06T 7/11 | (2017.01) |
| H04N 5/235 | (2006.01) |
| G06F 3/00 | (2006.01) |

(52) U.S. Cl.
CPC ............... *G06T 7/20* (2013.01); *G06T 7/11* (2017.01); *H04N 5/2351* (2013.01); *H04N 5/2354* (2013.01); *G06T 2207/10152* (2013.01)

(58) Field of Classification Search
CPC ................ G06F 3/00; G06K 9/00; G06T 7/00

USPC .......................................................... 382/103
See application file for complete search history.

(56) References Cited

U.S. PATENT DOCUMENTS

| 4,779,118 A * | 10/1988 | Millard ................. G03B 7/097 396/242 |
| 6,677,987 B1 | 1/2004 | Girod |
| 9,277,630 B2 * | 3/2016 | Braunstein ......... H05B 37/0227 |
| 2011/0202306 A1 | 8/2011 | Eng et al. |
| 2016/0274659 A1 | 9/2016 | Caraffi et al. |

FOREIGN PATENT DOCUMENTS

| TW | I343015 B | 6/2011 |
| TW | 201416908 A | 5/2014 |
| TW | 201621556 A | 6/2016 |

OTHER PUBLICATIONS

Corresponding Taiwan office action dated Nov. 19, 2018.

* cited by examiner

*Primary Examiner* — Abolfazl Tabatabai
(74) *Attorney, Agent, or Firm* — CKC & Partners Co., LLC (57) ABSTRACT

An object tracking method includes measuring ambient light by a camera to determine an ambient exposure value on the condition that an illuminating object being off, controlling the illuminating object to be on and configuring a luminance value of the illuminating object according to the ambient exposure value, and tracking the illuminating object based on at least one image captured from the camera by the ambient exposure value.

17 Claims, 7 Drawing Sheets

METHOD, DEVICE, AND NON-TRANSITORY COMPUTER READABLE STORAGE MEDIUM FOR OBJECT TRACKING

RELATED APPLICATIONS

This application claims priority to U.S. Provisional Application Ser. No. 62/435,856 filed Dec. 19, 2016, which is herein incorporated by reference.

BACKGROUND

Technical Field

The present disclosure relates to an electronic device and a method. More particularly, the present disclosure relates to an object tracking device and an object tracking method.

Description of Related Art

Nowadays, computer vision methods, in particular, object tracking, are widely used in various application. For example, object tracking may be used in a virtual reality (VR) system to detect the movement of users.

However, sensors in cameras have a limited dynamic range. Accordingly, when a photo or an image is taken, either the highlights are overexposed, or details in darker zones are lost, which may cause the difficulties for object tracking and thus resulting a low accuracy and/or efficiency.

SUMMARY

One aspect of the present disclosure is related to an object tracking method. In accordance with one embodiment of the present disclosure, the object tracking method includes: measuring ambient light by a camera to determine an ambient exposure value on the condition that an illuminating object being off, controlling the illuminating object to be on and configuring a luminance value of the illuminating object according to the ambient exposure value, and tracking the illuminating object based on at least one image captured from the camera by the ambient exposure value.

Another aspect of the present disclosure is related to an object tracking device. In accordance with one embodiment of the present disclosure, the object tracking device includes one or more processing components, a camera electrically connected to the one or more processing components, a memory electrically connected to the one or more processing components, and one or more programs. The one or more programs are stored in the memory and configured to be executed by the one or more processing components. The one or more programs comprising instructions for: controlling the camera to measure ambient light to determine an ambient exposure value on the condition that an illuminating object being off, controlling the illuminating object to be on and configuring a luminance value of the illuminating object according to the ambient exposure value, and tracking the illuminating object based on at least one image captured from the camera by the ambient exposure value.

Another aspect of the present disclosure is related to a non-transitory computer readable storage medium. In accordance with one embodiment of the present disclosure, the non-transitory computer readable storage medium stores one or more programs including instructions, which when executed, causes one or more processing components to perform operations including: controlling a camera to measure ambient light to determine an ambient exposure value on the condition that an illuminating object being off, controlling the illuminating object to be on and configuring a luminance value of the illuminating object according to the ambient exposure value, and tracking the illuminating object based on at least one image captured from the camera by the ambient exposure value.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

It will be understood that, in the description herein and throughout the claims that follow, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

It will be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, the terms "comprise" or "comprising," "include" or "including," "have" or "having,"

"contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

It will be understood that, in the description herein and throughout the claims that follow, words indicating direction used in the description of the following embodiments, such as "above," "below," "left," "right," "front" and "back," are directions as they relate to the accompanying drawings. Therefore, such words indicating direction are used for illustration and do not limit the present disclosure.

It will be understood that, in the description herein and throughout the claims that follow, unless otherwise defined, all terms (including technical and scientific terms) have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. § 112(f). In particular, the use of "step of" in the claims herein is not intended to invoke the provisions of 35 U.S.C. § 112(f).

Figure 1:
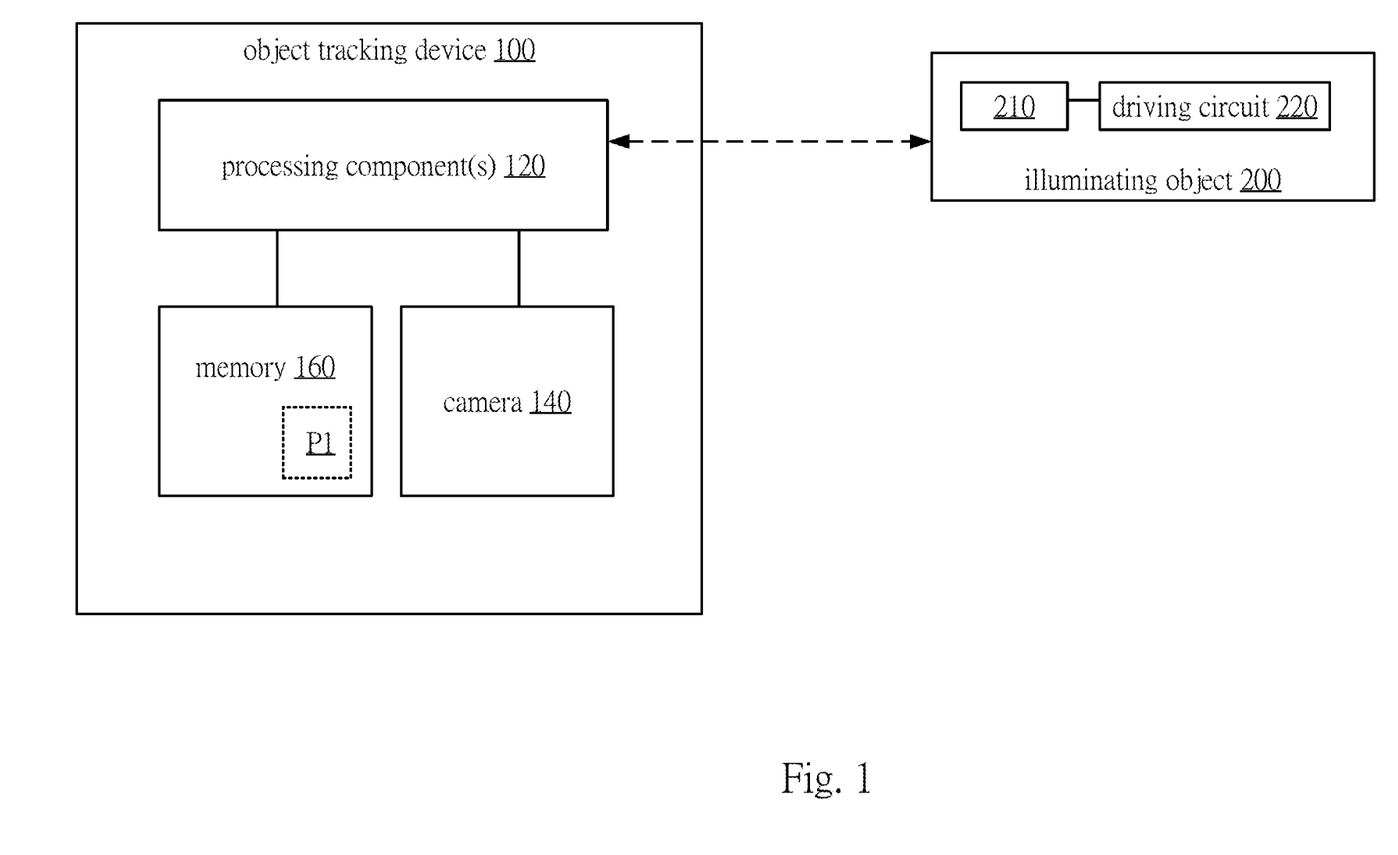
FIG. 1 is a schematic block diagram illustrating an object tracking device in accordance with some embodiments of the present disclosure.

Reference is made to FIG. 1. FIG. 1 is a schematic block diagram illustrating an object tracking device 100 in accordance with some embodiments of the present disclosure. In some embodiment, the object tracking device 100 may be applied in a virtual reality (VR)/mixed reality (MR)/augmented reality (AR) system for tracking the movement of one or more illuminating object 200 in the physical/real-world environment. For example, the illuminating object 200 may be a VR controller, which may be realized by, for example, a handheld controller, such as a controller for Vive or a controller for Gear. Accordingly, on the condition that a user holding the illuminating object 200, the object tracking device 100 may detect the movement of the user by tracking the movement of the illuminating object 200. In addition, the object tracking device 100 may detect the movement of a plurality of users respectively by tracking the movement of a plurality of illuminating objects 200 respectively.

In the embodiment shown in FIG. 1, the object tracking device 100 includes one or more processing components 120, a camera 140, and a memory 160. As shown in FIG. 1, the one or more processing components 120 are electrically connected to the camera 140 and the memory 160. In some embodiments, the object tracking device 100 may further include signal transceivers (not shown) for transmitting and receiving signals between the object tracking device 100 and the illuminating object 200.

In some embodiments, the one or more processing components 120 can be realized by, for example, one or more processors, such as central processors and/or microprocessors, but are not limited in this regard. In some embodiments, the memory 160 includes one or more memory devices, each of which includes, or a plurality of which collectively include a computer readable storage medium. The computer readable storage medium may include a read-only memory (ROM), a flash memory, a floppy disk, a hard disk, an optical disc, a flash disk, a flash drive, a tape, a database accessible from a network, and/or any storage medium with the same functionality that can be contemplated by persons of ordinary skill in the art to which this disclosure pertains.

In some embodiments, the one or more processing components 120 may run or execute various software programs P1 and/or sets of instructions stored in memory 160 to perform various functions for the object tracking device 100. Thus, the object tracking device 100 may track the illuminating object 200 using the camera 140.

Specifically, an illuminating element 210 is arranged on the illuminating object 200. The illuminating element 210 is electrically coupled to the driving circuit 220. In some embodiments, the illuminating element 210 may be implemented by a LED luminaire module, but is not limited thereto. Specifically, the driving circuit 220 may output pulse-width modulation signals to the LED units respectively to adjust the light intensities of the illuminating element 210, in order to configure a luminance value of the illuminating object 200.

Figure 2:
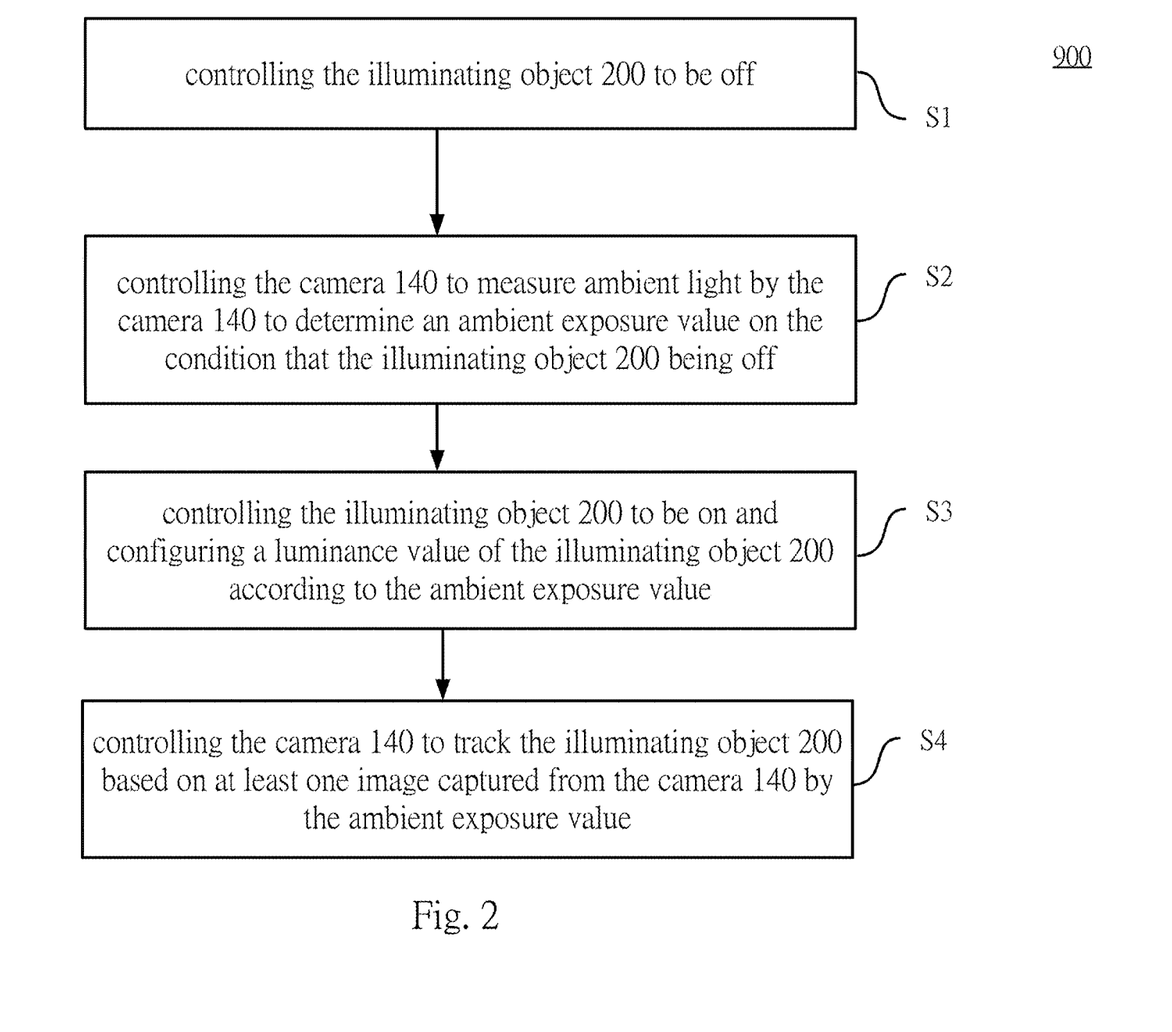
FIG. 2 is a flowchart illustrating an object tracking method in accordance with some embodiments of the present disclosure.

For better understanding of the present disclosure, the detailed operation of the object tracking device 100 will be discussed in accompanying with the embodiment shown in FIG. 2. FIG. 2 is a flowchart illustrating an object tracking method 900 in accordance with some embodiments of the present disclosure. It should be noted that the object tracking method 900 can be applied to an electrical device having a structure that is the same as or similar to the structure of the object tracking device 100 shown in FIG. 1. To simplify the description below, the embodiment shown in FIG. 1 will be used as an example to describe the object tracking method 900 according to some embodiments of the present disclosure. However, the present disclosure is not limited to application to the embodiment shown in FIG. 1.

As shown in FIG. 2, the object tracking method 900 includes operations S1, S2, S3 and S4.

In operation S1, the one or more processing components 120 control the illuminating object 200 to be off.

Figure 3:
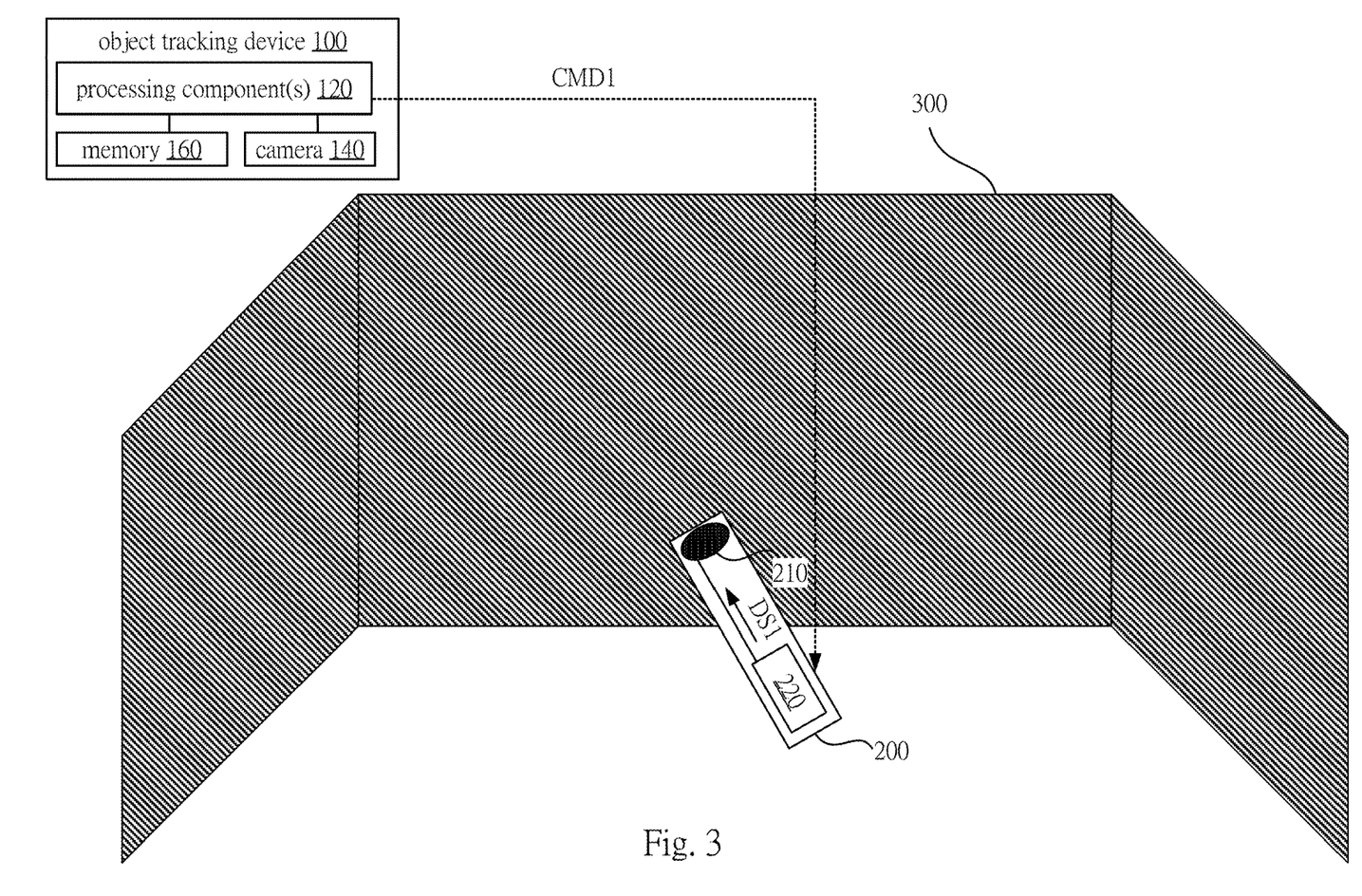
FIG. 3 is a diagram illustrating the operation of the object tracking device according to some embodiments of the present disclosure.

Reference is made to FIG. 3. FIG. 3 is a diagram illustrating the operation of the object tracking device 100 according to some embodiments of the present disclosure. As shown in FIG. 3, in some embodiments, in operation S1, the one or more processing components 120 may, via signal transceivers, transmit a host command CMD1 to the illuminating object 200 to control the illuminating object 200 to be off. Alternatively stated, during this period, the driving circuit 220 is configured to output the driving signal DS1, in response to the host command CMD1, to disable the illuminating element 210 so that the illuminating element 210 does not illuminate.

Then, in operation S2, the one or more processing components 120 may control the camera 140, via corresponding commands, in order to measure ambient light in the environment 300 by the camera 140 to determine an ambient exposure value on the condition that the illuminating object 200 being off. Since the illuminating element 210 does not illuminate, the camera 140 may detect and estimate an ambient light condition using one or more image sensors arranged in the camera 140, and calculate a proper ambient exposure value through, for example, an auto exposure calculation. Thus, the risk of overexposure and/or underexposure is reduced. Accordingly, the camera 140 may be configured to take pictures using the ambient exposure value to obtain one or more images containing more background and object details.

Next, in step S3, the one or more processing components 120 control the illuminating object 200 to be on and configuring a luminance value of the illuminating object 200 according to the ambient exposure value.

Figure 4:
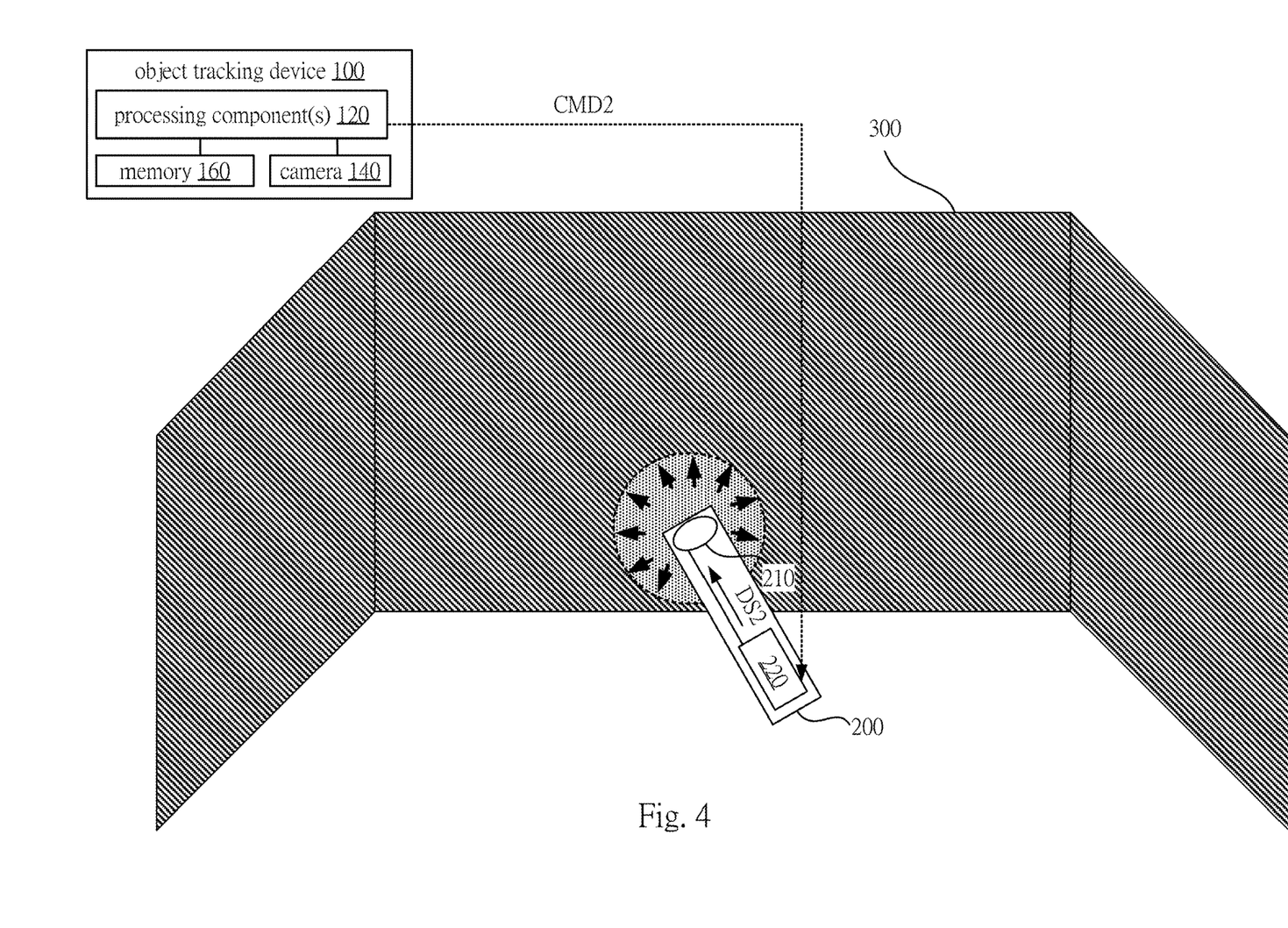
FIG. 4 is a diagram illustrating the operation of the object tracking device according to some embodiments of the present disclosure.

Reference is made to FIG. 4. FIG. 4 is a diagram illustrating the operation of the object tracking device 100 according to some embodiments of the present disclosure. As shown in FIG. 4, in some embodiments, in operation S3, the one or more processing components 120 may, via signal transceivers, transmit a host command CMD2 to the illuminating object 200 to control the illuminating object 200 to be on. Alternatively stated, during this period, the driving circuit 220 is configured to output the driving signal DS2, in response to the host command CMD2, to turn on the illuminating element 210 so that the illuminating element 210 illuminates with the luminance value corresponding to the host command CMD2. For example, in some embodiments, the driving circuit 220 may output pulse-width modulation signals to the illuminating element 210 to adjust the light intensities of the illuminating element 210. Thus, the driving circuit 220 may configure the luminance value of the illuminating element 210.

Specifically, in some embodiments, in operation S3, the one or more processing components 120 may configure the luminance value of the illuminating object 200 to be the ambient exposure value with an incremental compensation by outputting the corresponding host command CMD2. That is, the luminance value of the illuminating object 200 may be configured to be greater than the ambient luminance in a predefined value. For example, the one or more processing components 120 may first calculate a predetermined step increment (e.g., +1 EV) to the ambient exposure value. Then, the one or more processing components 120 may configure the luminance value of the illuminating object 200 based on the predetermined step increment (e.g., +1 EV). It is noted that, the above stated step increment is merely for the exemplary purpose and not meant to limit the present disclosure. For example, the step increment may be set to +⅓ EV, +½ EV, +⅔ EV, +1 EV, +4/3 EV, +3/2 EV, +5/3 EV, +2 EV, or any suitable values.

Since the luminance value of the illuminating object 200 is properly configured, in the next operation S4, the one or more processing components 120 may control the camera 140 to track the illuminating object 200 based on at least one image captured from the camera 140 by the ambient exposure value.

It is noted that, the predetermined step increment may be set correspondingly according to the sensitivity of the image sensor of the camera 140, such that while the illuminating object 200 illuminates, the camera 140 may still capture the images without underexposure or overexposure using the ambient exposure value. Accordingly, the illuminating object 200 may be tracked by the tracking algorithm using the luminance difference between the illuminating object 200 and the surrounding background in the environment 300.

Figure 5:
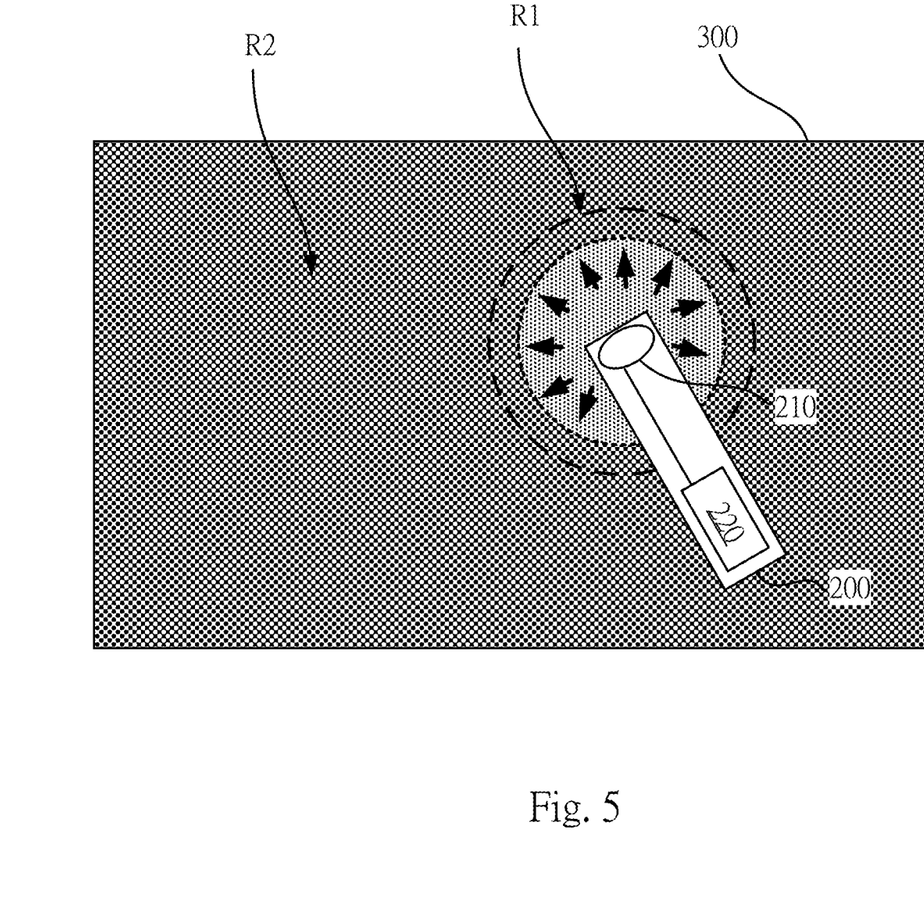
FIG. 5 is a diagram illustrating the tracking of the illuminating object according to some embodiments of the present disclosure.

Reference is made to FIG. 5. FIG. 5 is a diagram illustrating the tracking of the illuminating object 200 according to some embodiments of the present disclosure. As shown in FIG. 5, in some embodiment, in operation S4, the one or more processing components may further determine an illuminating object region R1 and an ambient region R2 on the condition that the illuminating object 200 is tracked, and perform auto exposure calculation in the ambient region R2, with the illuminating object region R1 cropped out.

Since the illuminating object region R1 is cropped out and removed from the auto exposure calculation, the auto exposure calculation performed in the ambient region R2 may calculate the proper exposure setting in the environment 300 for the camera 140 accurately. Thus, the exposure setting for the camera 140 will not be misconfigured due to the light illuminated by the illuminating object 200.

Figure 6:
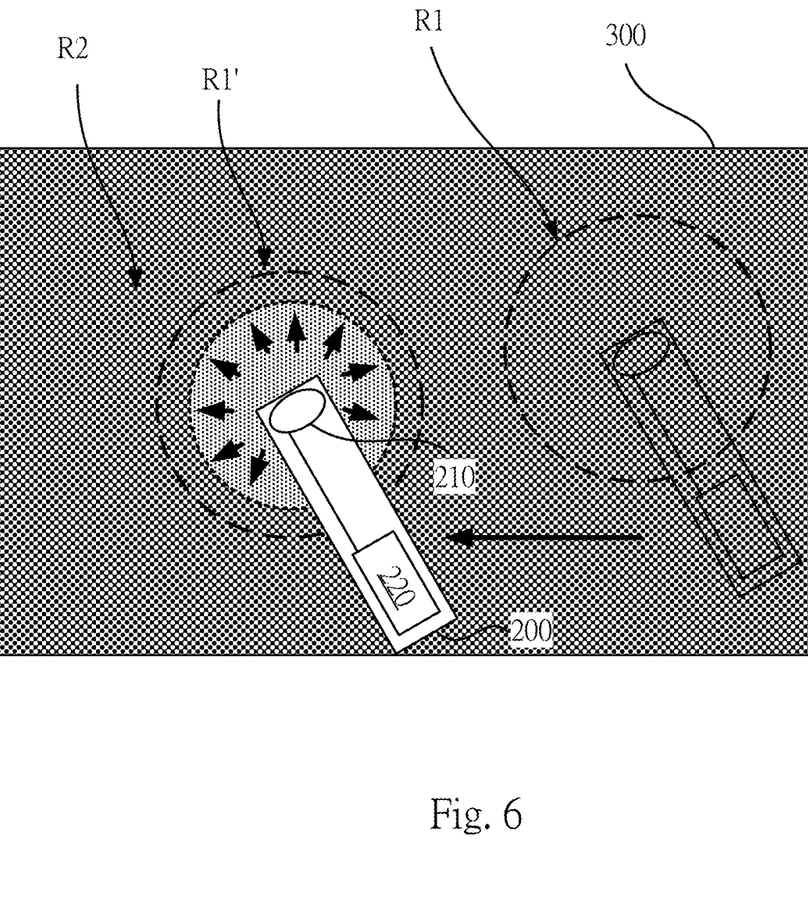
FIG. 6 is a diagram illustrating the tracking of the illuminating object according to some embodiments of the present disclosure.

Reference is made to FIG. 6. FIG. 6 is a diagram illustrating the tracking of the illuminating object 200 according to some embodiments of the present disclosure. As shown in FIG. 6, in some embodiments, with the movement of the illuminating object 200, the one or more processing components 120 may further update the illuminating object region R1 and the ambient region R2 according to the location of the illuminating object 200. On the condition that the location of the illuminating object 200 changes due to the user's movement, since the illuminating object 200 is tracked by the object tracking device 100 using the visible light, the illuminating object region R1 and the ambient region R2 may be updated according to the location of the illuminating object 200. For example, in the current embodiment, as the location of the illuminating object 200 changes, an updated illuminating object region R1' is calculated by the one or more processing components 120.

Figure 7A:
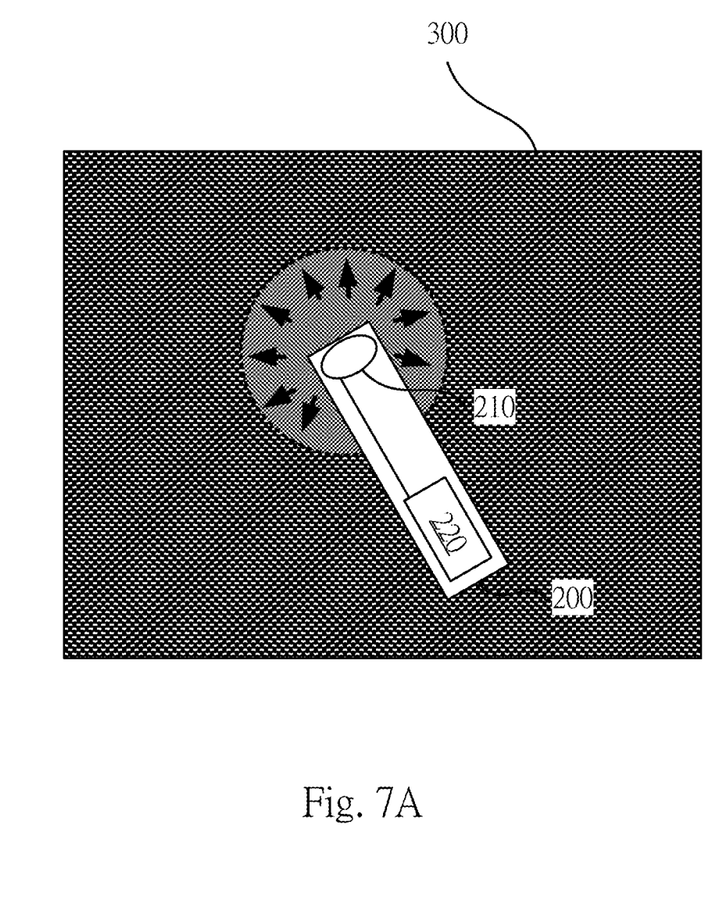
FIG. 7A and FIG. 7B are diagrams illustrating the configuration of the illuminating object according to some embodiments of the present disclosure.
Figure 7B:
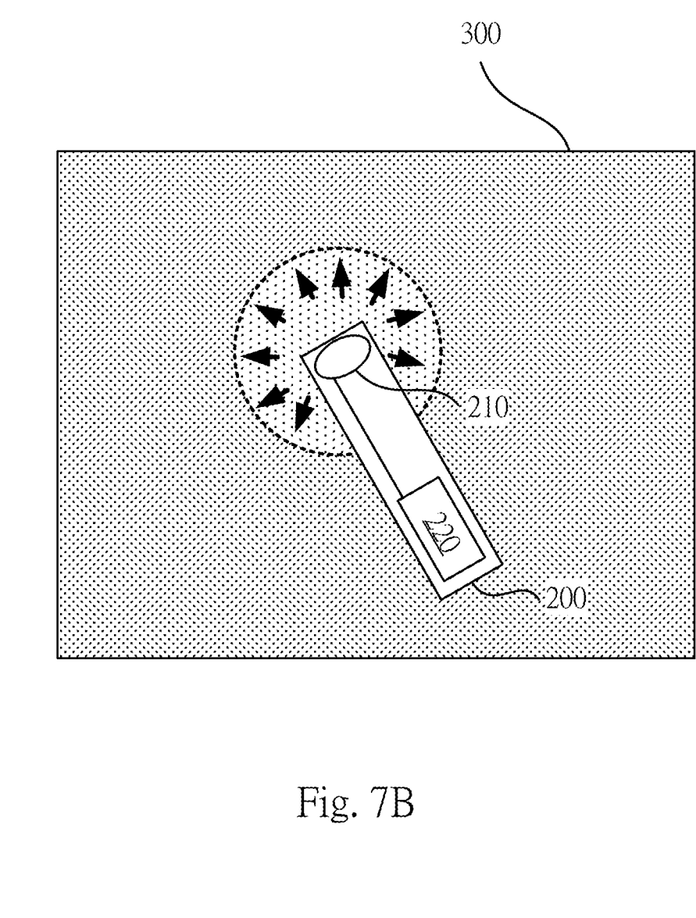

Reference is made to FIG. 7A and FIG. 7B. FIG. 7A and FIG. 7B are diagrams illustrating the configuration of the illuminating object 200 according to some embodiments of the present disclosure.

In some embodiments, the ambient luminance may vary due to the change of the lighting condition of the environment. As shown in FIG. 7A and FIG. 7B, in such cases, the one or more processing components 120 may further update the luminance value of the illuminating object 200 on the condition that the ambient exposure value is changed. Alternatively stated, when the ambient lighting condition is changed, the ambient exposure value calculated by the cooperation of the camera 140 and the one or more processing components 120 may be updated correspondingly. The one or more processing components 120 may adjust the luminance value of the illuminating object 200 according to the updated ambient exposure value.

Specifically, as shown in FIG. 7A, the ambient exposure value may be lower than the previous value when there is less ambient light in the environment 300. Accordingly, on the condition that the ambient exposure value is lowered according to the ambient light, the one or more processing components 120 may lower the luminance value of the illuminating object 200. Therefore, the risk of overexposure or underexposure may be reduced while the new ambient exposure value is applied for the camera 140 to take the images and the new luminance value is applied to the illuminating object 200 to obtain a dimmer light.

On the other hand, as shown in FIG. 7B, the ambient exposure value may be greater than the previous value when there is more ambient light in the environment 300. Accordingly, on the condition that the ambient exposure value is increased according to the ambient light, the one or more processing components 120 may increase the luminance value of the illuminating object 200. Similarly, the risk of overexposure or underexposure may be reduced while the new ambient exposure value is applied for the camera 140 to take the images and the new luminance value is applied to the illuminating object 200 to obtain a brighter light.

It should be noted that, in some embodiments, the object tracking method 900 may be implemented as a computer program. When the computer program is executed by a computer, an electronic device, or the one or more processing components 120 in FIG. 1, this executing device performs the object tracking method 900. The computer program can be stored in a non-transitory computer readable storage medium such as a ROM (read-only memory), a flash memory, a floppy disk, a hard disk, an optical disc, a flash disk, a flash drive, a tape, a database accessible from a network, or any storage medium with the same functionality that can be contemplated by persons of ordinary skill in the art to which this disclosure pertains.

In addition, it should be noted that in the operations of the abovementioned object tracking method 900, no particular sequence is required unless otherwise specified. Moreover, the operations may also be performed simultaneously or the execution times thereof may at least partially overlap.

Furthermore, the operations of the object tracking method 900 may be added to, replaced, and/or eliminated as appropriate, in accordance with various embodiments of the present disclosure.

Through the operations of various embodiments described above, an object tracking method using visible light is implemented, and the ambient exposure value is properly configured to fit both the ambient image and the trackable object, such that overexposure and/or underexposure is avoided. Since the object tracking may be achieved using one image taken by the camera 140, and no further image process, such as merging multiple images, is required, the method disclosed in the above various embodiments may be applied in visual tracking system and improve the accuracy and the efficiency of the object tracking.

Although the present disclosure has been described in considerable detail with reference to certain embodiments thereof, other embodiments are possible. Therefore, the scope of the appended claims should not be limited to the description of the embodiments contained herein.

What is claimed is:

1. An object tracking method comprising:
    measuring ambient light by a camera to determine an ambient exposure value on the condition that an illuminating object being off;
    controlling the illuminating object to be on and configuring a luminance value of the illuminating object according to the ambient exposure value;
    tracking the illuminating object based on at least one image captured from the camera by the ambient exposure value; and
    updating the luminance value of the illuminating object on the condition that the ambient exposure value is changed.

2. The object tracking method of claim 1, wherein the step of configuring the luminance value of the illuminating object comprises:
    configuring the luminance value of the illuminating object to be the ambient exposure value with an incremental compensation.

3. The object tracking method of claim 2, wherein the step of configuring the luminance value of the illuminating object further comprises:
    calculating a predetermined step increment to the ambient exposure value; and
    configuring the luminance value of the illuminating object based on the predetermined step increment.

4. The object tracking method of claim 1, further comprising:
    determining an illuminating object region and an ambient region on the condition that the illuminating object is tracked; and
    performing auto exposure calculation in the ambient region with the illuminating object region cropped out.

5. The object tracking method of claim 4, further comprising:
    updating the illuminating object region and the ambient region according to the location of the illuminating object.

6. The object tracking method of claim 1, wherein the step of updating the luminance value of the illuminating object comprises:
    increasing the luminance value of the illuminating object on the condition that the ambient exposure value is increased according to the ambient light; and
    lowering the luminance value of the illuminating object on the condition that the ambient exposure value is lowered according to the ambient light.

7. An object tracking device comprising:
    one or more processing components;
    a camera electrically connected to the one or more processing components;
    a memory electrically connected to the one or more processing components; and
    one or more programs, wherein the one or more programs are stored in the memory and configured to be executed by the one or more processing components, the one or more programs comprising instructions for:
    controlling the camera to measure ambient light to determine an ambient exposure value on the condition that an illuminating object being off;
    controlling the illuminating object to be on and configuring a luminance value of the illuminating object according to the ambient exposure value;
    tracking the illuminating object based on at least one image captured from the camera by the ambient exposure value; and
    updating the luminance value of the illuminating object on the condition that the ambient exposure value is changed.

8. The object tracking device as claimed in claim 7, wherein the one or more programs further comprises instructions for:
    configuring the luminance value of the illuminating object to be the ambient exposure value with an incremental compensation.

9. The object tracking device as claimed in claim 8, wherein the one or more programs further comprises instructions for:
    calculating a predetermined step increment to the ambient exposure value; and
    configuring the luminance value of the illuminating object based on the predetermined step increment.

10. The object tracking device as claimed in claim 7, wherein the one or more programs further comprises instructions for:
    determining an illuminating object region and an ambient region on the condition that the illuminating object is tracked; and
    performing auto exposure calculation in the ambient region with the illuminating object region cropped out.

11. The object tracking device as claimed in claim 10, wherein the one or more programs further comprises instructions for:
    updating the illuminating object region and the ambient region according to the location of the illuminating object.

12. The object tracking device as claimed in claim 7, wherein the one or more programs further comprises instructions for:
increasing the luminance value of the illuminating object on the condition that the ambient exposure value is increased according to the ambient light; and
lowering the luminance value of the illuminating object on the condition that the ambient exposure value is lowered according to the ambient light.

13. A non-transitory computer readable storage medium storing one or more programs comprising instructions, which when executed, causes one or more processing components to perform operations comprising:
controlling a camera to measure ambient light to determine an ambient exposure value on the condition that an illuminating object being off;
controlling the illuminating object to be on and configuring a luminance value of the illuminating object according to the ambient exposure value;
tracking the illuminating object based on at least one image captured from the camera by the ambient exposure value; and
updating the luminance value of the illuminating object on the condition that the ambient exposure value is changed.

14. The non-transitory computer readable storage medium as claimed in claim 13 comprising instructions, which when executed, causes one or more processing components to further perform operations comprising:
configuring the luminance value of the illuminating object to be the ambient exposure value with an incremental compensation.

15. The non-transitory computer readable storage medium as claimed in claim 14 comprising instructions, which when executed, causes one or more processing components to further perform operations comprising:
calculating a predetermined step increment to the ambient exposure value; and
configuring the luminance value of the illuminating object based on the predetermined step increment.

16. The non-transitory computer readable storage medium as claimed in claim 13 comprising instructions, which when executed, causes one or more processing components to further perform operations comprising:
determining an illuminating object region and an ambient region on the condition that the illuminating object is tracked; and
performing auto exposure calculation in the ambient region with the illuminating object region cropped out.

17. The non-transitory computer readable storage medium as claimed in claim 16 comprising instructions, which when executed, causes one or more processing components to further perform operations comprising:
updating the illuminating object region and the ambient region according to the location of the illuminating object.

* * * * *